Patented Sept. 16, 1924.

1,509,076

UNITED STATES PATENT OFFICE.

LÁSZLÓ BERCZELLER, OF BUDAPEST, HUNGARY.

TREATMENT OF SOY BEANS.

No Drawing.  Application filed April 10, 1924. Serial No. 705,701.

*To all whom it may concern:*

Be it known that I, LÁSZLÓ BERCZELLER, chemist, a subject of the Hungarian Kingdom, residing at Budapest, Hungary, have invented certain new and useful Improvements in the Treatment of Soy Beans, of which the following is a specification.

My invention relates to a process for purifying soy beans which in their natural state are very evil-tasting. To this end, and according to the invention, the beans are subjected to the action of steam (preferably saturated steam) for a short period of time, so that they absorb only a very small quantity of water, for the purpose of preventing albuminous matter from being affected thereby. The whole of the bean is almost entirely transformed by this short steam treatment. The nauseous flavour vanishes, and experiments on animals have shown that beans thus treated are perfectly innocuous whilst aqueous extracts from raw soy beans have a poisonous effect.

It is known to steam fodder such as for example lupines to kill fungi adhering thereto or to destroy poisonous substances contained therein, that is to say to remove bitterness therefrom. In these processes however the material is treated with high-pressure steam, e. g. at a temperature at which the albuminous substances are unavoidably altered, the more so as the material to be steamed is usually under high pressure for and hour or more. A treatment of this description applied to soy beans would, from a biological point of view, heavily injure the albuminous substances. It has indeed been ascertained that the simple grinding of soy beans lowers their biological value to an extent generally not observed in connection with cereals and most leguminous products. This is the reason why attempts heretofore made to alter the taste of soy beans, by roasting or boiling have generally not led to satisfactory results. According to my present invention, soy beans are subjected to a non-injurious steam treatment yielding a product in which the albuminous matter is not detrimentally altered and which is highly digestible, highly nutritious and most pleasing in flavour.

According to a known method of treating peas, the latter are steamed for a short period of time as a preparatory treatment for polishing purposes, but the raw taste of the peas is not altered thereby, so that there was no reason to assume that a similar short steam treatment applied to whole soy beans would yield such far-reaching results. Raw pea albumin is unpalatable and biologically inferior, and remains so in both respects after being steamed for a short period of time. The raw soy bean is not only unsavoury but decidedly poisonous. Now soy beans steamed for a short time will yield a food which is much like dried milk, that is to say the beans acquire a pleasant taste and are biologically valuable.

The final product derived from this short steam treatment is in appearance almost undistinguishable from the initial material and may be ground in any grinding machine after it is deprived of the slight amount of moisture absorbed in the course of the steam treatment. The ground material is a light yellow flour and is a highly valuable food on account of the 38 to 42% of albumen it contains. This food is fit for human consumption in the most varied forms, either alone or mixed with starchy matter. Beans treated as described in the foregoing can be made suitable for nutritive purposes also in the non-ground condition, either by soaking or boiling them, or both.

Steam treatment proved to be valuable also when applied to soaked or germinated soy beans which lost their peculiar taste in a few minutes and could therefore be used for the preparation of food either in a moist or a dry condition.

By way of example, the invention may be carried into practice as follows:

The beans are subjected to the action of saturated steam for a short period of time (about 10 to 12 minutes), and are simultaneously agitated, in an iron vessel which is preferably steam-jacketed or at least heat-insulated. The steam is produced in the jacket or supplied thereto from outside and allowed to enter the vessel proper above the beans through a nozzle fitted to the cover. This arrangement almost entirely precludes the condensation of water on the walls or on the beans so that the latter absorb the smallest possible amount of moisture. A substantially similar result (though not quite so satisfactory) may be obtained by heating the vessel to just over 100° C., the temperature of the steam flowing into the vessel for a short time being 100° C. The steaming is completed when steam issues from the outlet on the lower face of the vessel at the rate at which it enters the latter above the beans. These are now dried for a short period of time to restore firmness thereto and make them suitable for grinding. The beans may be deprived of the slight amount of absorbed moisture in any suitable way. An advantageous method of doing this however, is to subject the hot contents of the vessel to a vacuum, immediately after the end of the steaming operation, so that the moisture is removed within a few minutes. The beans have now recovered the firmness which makes them suitable for grinding.

The steamed and dried beans can be most easily husked and the absence of husk considerably reduces their proportion of cellulose. The taste of steamed and huskless beans is better than that of beans with their husk. The purification or improvement of soy beans according to the invention is remarkably increased by steam-treating them as described after the husk is removed. The time of treatment is thus considerably shortened and the improvement as regards taste is still greater. Moreover, flour lighter in colour is produced from dry beans treated according to this preferred method of carrying out the present process.

It is known to steam-treat maize at a temperature below 100° C. for the purpose of removing bitterness and producing maize flour for making bread and pastry. The material however has to be steamed for several hours; this treatment applied to soy beans would bring about very detrimental alterations therein, so that it was not possible to foresee the remarkable effect produced on soy beans by a short steam treatment.

I claim:

1. A process for purifying soy beans, which comprises subjecting the beans to the action of steam for such a short period of time, that they absorb but a very small amount of water and that the albuminous substances in the said beans remain substantially uninjured.

2. A process for purifying soy beans, which comprises subjecting the beans to the action of saturated steam for such a short period of time, that they absorb but a very small amount of water and that the albuminous substances in the said beans remain substantially uninjured.

3. A process for purifying soy beans, which comprises subjecting the beans to the action of saturated steam for such a short period of time, that they absorb but a very small amount of water and that the albuminous substances in the said beans remain substantially uninjured, and then drying the beans for a short period of time to restore firmness thereto and finally grinding the same.

4. A process for purifying soy beans, which comprises subjecting the beans to the action of saturated steam for such a short period of time, that they absorb but a very small amount of water and that the albuminous substances in the said beams remain substantially uninjured, then drying the beans for a short period of time to restore firmness thereto and finally husking and grinding the same.

5. A process for purifying soy beans, which comprises subjecting the beans to the action of saturated steam for such a short period of time, that they absorb but a very small amount of water and that the albuminous substances in the said beans remain substantially uninjured, and agitating the beans during such treatment.

6. A process of treating soy beans which comprises subjecting the same in a huskless state, and while being agitated, to direct contact with saturated steam, while maintaining said beans at steam temperature by means other than the said saturated steam in contact with the beans, whereby only a very small amount of said steam is condensed in contact with the beans.

7. A process for purifying soy beans, which comprises subjecting the beans in a huskless state to the action of saturated steam for such a short period of time, that they absorb but a very small amount of water and that the albuminous substances in the said beans remain substantially uninjured.

8. A process of treating soy beans, which comprises subjecting the same to direct contact with saturated steam, while maintaining said beans at steam temperature by means other than the said saturated steam in contact with the beans, whereby only a very small amount of said steam is condensed in contact with the beans.

9. A process for purifying soy beans, which comprises subjecting the beans in a germinated state to the action of saturated steam, and simultaneously agitating the beans, this steaming operation being continued until the said beans are thoroughly heated, and then drying the beans.

10. A process for purifying soy beans, which comprises subjecting the beans in a previously soaked condition to the action of saturated steam until thoroughly heated, and simultaneously agitating the beans, then drying the beans for a short period of time by subjecting the hot contents of the vessel to a vacuum immediately after the end of the steaming operation to restore firmness thereto, and finally grinding the same.

In testimony whereof I have affixed my signature.

LÁSZLÓ BERCZELLER.